US011274880B2

(12) United States Patent
Guy et al.

(10) Patent No.: US 11,274,880 B2
(45) Date of Patent: Mar. 15, 2022

(54) METHOD AND SYSTEM FOR EFFICIENT NONSYNCHRONOUS LNG PRODUCTION USING LARGE SCALE MULTI-SHAFT GAS TURBINES

(71) Applicants: Ashley R. Guy, Houston, TX (US); Sorin T. Lupascu, Spring, TX (US); Donna J. Parker, The Woodlands, TX (US); Yow-Yeen Lee, The Woodlands, TX (US)

(72) Inventors: Ashley R. Guy, Houston, TX (US); Sorin T. Lupascu, Spring, TX (US); Donna J. Parker, The Woodlands, TX (US); Yow-Yeen Lee, The Woodlands, TX (US)

(73) Assignee: ExxonMobil Upstream Research Company, Spring, TX (US)

( * ) Notice: Subject to any disclaimer, the term of this patent is extended or adjusted under 35 U.S.C. 154(b) by 208 days.

(21) Appl. No.: 15/934,292

(22) Filed: Mar. 23, 2018

(65) Prior Publication Data
US 2018/0335253 A1     Nov. 22, 2018

Related U.S. Application Data

(60) Provisional application No. 62/570,998, filed on Oct. 11, 2017, provisional application No. 62/506,922, filed on May 16, 2017.

(51) Int. Cl.
*F25J 1/02* (2006.01)
*F02C 7/277* (2006.01)
*F25J 1/00* (2006.01)

(52) U.S. Cl.
CPC ............ *F25J 1/0287* (2013.01); *F02C 7/277* (2013.01); *F25J 1/0022* (2013.01); *F25J 1/0052* (2013.01);
(Continued)

(58) Field of Classification Search
CPC ........ F25J 1/0022; F25J 1/0087; F25J 1/0072; F25J 1/0052; F25J 1/0055; F25J 1/0218;
(Continued)

(56) References Cited

U.S. PATENT DOCUMENTS 5,689,141 A    11/1997   Kikkawa et al. ............... 290/52
6,308,531 B1   10/2001   Roberts et al. .................. 62/611
(Continued)

FOREIGN PATENT DOCUMENTS

| EP | 2426452 A1 * | 3/2012 | ............. F25J 1/0216 |
| WO | WO2012/031782 | 3/2012 | ................ F25J 1/02 |

(Continued)

OTHER PUBLICATIONS

ConocoPhillips Liquefied Natural Gas Licensing (2017) "Our Technology And Expertise Are Ready To Work Toward Your LNG Future Today," http://lnglicensing.conocophillips.com/Documents/15-1106%20LNG%20Brochure_March2016.pdf, Apr. 25, 2017, 5 pgs.
(Continued)

*Primary Examiner* — Brian M King
(74) *Attorney, Agent, or Firm* — ExxonMobil Upstream Research Company—Law Department (57) ABSTRACT

A drive system for liquefied natural gas (LNG) refrigeration compressors in a LNG liquefaction plant. Each of three refrigeration compression strings include refrigeration compressors and a multi-shaft gas turbine capable of nonsynchronous operation. The multi-shaft gas turbine is operationally connected to the refrigeration compressors and is configured to drive the one or more refrigeration compressors. The multi-shaft gas turbine uses its inherent speed turndown range to start the one or more refrigeration compressors from rest, bring the one or more refrigeration compressors up to an operating rotational speed, and adjust
(Continued)

compressor operating points to maximize efficiency of the one or more refrigeration compressors, without assistance from electrical motors with drive-through capability and variable frequency drives.

8 Claims, 6 Drawing Sheets

(52) U.S. Cl.
CPC ........... *F25J 1/0055* (2013.01); *F25J 1/0072* (2013.01); *F25J 1/0087* (2013.01); *F25J 1/029* (2013.01); *F25J 1/0216* (2013.01); *F25J 1/0218* (2013.01); *F25J 1/0236* (2013.01); *F25J 1/0245* (2013.01); *F25J 1/0248* (2013.01); *F25J 1/0283* (2013.01); *F25J 1/0292* (2013.01); *F25J 1/0295* (2013.01); *F25J 1/0296* (2013.01); *F25J 1/0298* (2013.01); *F25J 2215/64* (2013.01); *F25J 2215/66* (2013.01); *F25J 2220/64* (2013.01); *F25J 2230/20* (2013.01); *F25J 2230/22* (2013.01); *F25J 2280/10* (2013.01)

(58) Field of Classification Search
CPC ........ F25J 1/0219; F25J 1/0247; F25J 1/0283; F25J 1/029; F25J 1/0295; F25J 2230/22
See application file for complete search history.

(56) References Cited

U.S. PATENT DOCUMENTS

| | | | |
|---|---|---|---|
| 6,324,867 B1 | 12/2001 | Fanning et al. ................ | 62/613 |
| 7,526,926 B2 | 5/2009 | Rasmussen et al. ............ | 62/619 |
| 9,746,234 B2 | 8/2017 | Byfield et al. | |
| 9,841,230 B2 | 12/2017 | Masani et al. | |
| 2010/0147024 A1 | 6/2010 | Roberts et al. | |
| 2010/0293967 A1 | 11/2010 | Liskow et al. ...................... | 62/6 |
| 2011/0185767 A1* | 8/2011 | Jager ...................... | F25J 1/0055 |
| | | | 62/614 |
| 2012/0060552 A1* | 3/2012 | Van De Lisdonk .. | F01D 15/005 |
| | | | 62/611 |
| 2012/0090351 A1* | 4/2012 | Van De Lisdonk .... | F02C 7/143 |
| | | | 62/613 |
| 2012/0204598 A1 | 8/2012 | Mock et al. | |
| 2015/0285089 A1 | 10/2015 | Scarponi et al. | |
| 2016/0040928 A1 | 2/2016 | Rasmussen et al. | |
| 2018/0051928 A1 | 2/2018 | Huntington et al. ........... | 62/612 |

FOREIGN PATENT DOCUMENTS

| | | | |
|---|---|---|---|
| WO | WO2014/048845 | 4/2014 | ................ F25J 1/00 |
| WO | WO2017/067871 | 4/2017 | ............ F01D 15/10 |

OTHER PUBLICATIONS

ConocoPhillips LNG Technology & Licensing (2017) http://lnglicensing.conocophillips.com/Documents/SMID_016_Atlantictrain.pdf, Apr. 25, 2017.
Diocee, T. S. et al. (2004) "Atlantic LNG Train 4-The Worlds Largest LNG Train", *The 14th International Conference and Exhibition on Liquefied Natural Gas (LNG 14)*, Doha, Qatar, Mar. 21-24, 2004, 15 pgs.
Khoo, C. T. et al. (2009) "Execution of LNG Mega Trains-The Qatargas 2 Experience," *WCG*, 2009, 8 pages.
Ott, C. M. et al. (2015) "Large LNG Trains: Technology Advances to Address Market Challenges", *Gastech*, Singapore, Oct. 27-30, 2015, 10 pgs.
Roberts, M. J. et al. (2004) "Reducing LNG Capital Cost in Today's Competitive Environment", PS2-6, *The 14th International Conference and Exhibition on Liquefied Natural Gas (LNG 14)*, Doha, Qatar, Mar. 21-24, 2004, 12 pgs.
Shah, Pankaj et al. (2013) "Refrigeration Compressor Driver Selection and Technology Qualification Enhances Value for the Wheatstone Project," *17th Int'l Conf. & Exh. On LNG*, 27 pgs.
Tsang, T. P. et al. (2009) "Application of Novel Compressor/Driver Configuration in the Optimized Cascade Process," *2009 Spring Mtg. and Global Conf. on Process Safety-9th Topical Conf. on Gas Utilization*, 2009, Abstract, 1 pg. https://www.aiche.org/conferences/aiche-spring-meeting-and-global-congress-on-process-safety/2009/proceeding/paper/7a-application-novel-compressordriver-configuration-optimized-cascader-process.

* cited by examiner

FIG. 10

METHOD AND SYSTEM FOR EFFICIENT NONSYNCHRONOUS LNG PRODUCTION USING LARGE SCALE MULTI-SHAFT GAS TURBINES

CROSS REFERENCE TO RELATED APPLICATIONS

This application claims the priority benefit of both U.S. Patent Application No. 62/506,922 filed May 16, 2017 entitled METHOD AND SYSTEM FOR EFFICIENT NONSYNCHRONOUS LNG PRODUCTION USING LARGE SCALE MULTI-SHAFT GAS TURBINES, and U.S. patent application Ser. No. 62/570,998 filed Oct. 11, 2017 entitled METHOD AND SYSTEM FOR EFFICIENT NONSYNCHRONOUS LNG PRODUCTION USING LARGE SCALE MULTI-SHAFT GAS TURBINES, the entirety of both being incorporated by reference herein.

FIELD

The present techniques provide methods and systems for producing liquefied natural gas (LNG). More specifically, the present techniques provide for methods and systems to produce LNG using large-scale multi-shaft gas turbines.

BACKGROUND

This section is intended to introduce various aspects of the art, which can be associated with exemplary examples of the present techniques. This description is believed to assist in providing a framework to facilitate a better understanding of particular aspects of the present techniques. Accordingly, it should be understood that this section should be read in this light, and not necessarily as admissions of prior art.

Liquefied natural gas (LNG) is produced by cooling natural gas using processes that generally require refrigeration compressors and compressor drivers. Liquefying natural gas enables monetization of natural gas resources, and the meeting of energy demands, in areas where pipeline transport of natural gas is cost prohibitive. In a typical LNG refrigeration configuration, illustrated in FIG. 1, a common drive shaft 102 connects a gas turbine 104 to one end of a compressor 106. The common drive shaft 102 also connects a starter motor 108 to the other end of the compressor 106. The three connected devices are typically referred to as a compression string 100. Multiple collocated compression strings may be referred to as an LNG train.

Global LNG competition has intensified, with potential growth from new projects in development currently being forecast to outstrip new firm demand. To enhance the profitability of future LNG projects there is a need to identify and optimize the key cost drivers and efficiencies applicable to each project.

When a large scale resource is available, developing it with a small number of large capacity LNG trains can provide environmental benefits (such as minimizing the overall footprint of the constructed facilities) and economic benefits (such as accelerating the production profiles). Further, minimizing the number of compression strings installed in each LNG train can provide an avenue to reduce the capital cost required to develop the resource.

Many LNG trains currently in operation worldwide with capacities exceeding 5 MTA (million tons per annum) use the AP-C3MR™ or AP-X® process technologies licensed by Air Products and Chemicals. Inc. with refrigerant compressors driven by two to three large scale single shaft GE Frame 7E or GE Frame 9E industrial gas turbines. Other similarly sized LNG trains with capacities exceeding 5 MTA use the Optimized Cascade, process, owned by ConocoPhillips, with refrigerant compressors driven either by eight small scale two-shaft GE Frame 5D gas turbines or four single shaft GE Frame 6 and GE Frame 7 single shaft gas turbines.

Rasmussen (U.S. Pat. No. 7,526,926) explains that single shaft industrial gas turbines typically require a large electric starting motor to spin the turbine and compressor up to operating speed. To avoid shocking the drive train during start-up, a variable frequency drive is used to gradually increase the speed of the rotating shaft from 0 rpm up to 3,000 rpm (50 Hz), 3,600 rpm (60 Hz) or other target operating speed. The starter motor can function as a helper motor to supplement turbine output during normal operation and achieve LNG train capacities higher than throughput supported by gas turbine power alone. During normal operation the variable frequency drive can modulate the shaft speed to take advantage of the modest turndown range available to single-shaft gas turbines (on order of +/−5%) to improve operating efficiency of the refrigerant compressors.

Figure 2:
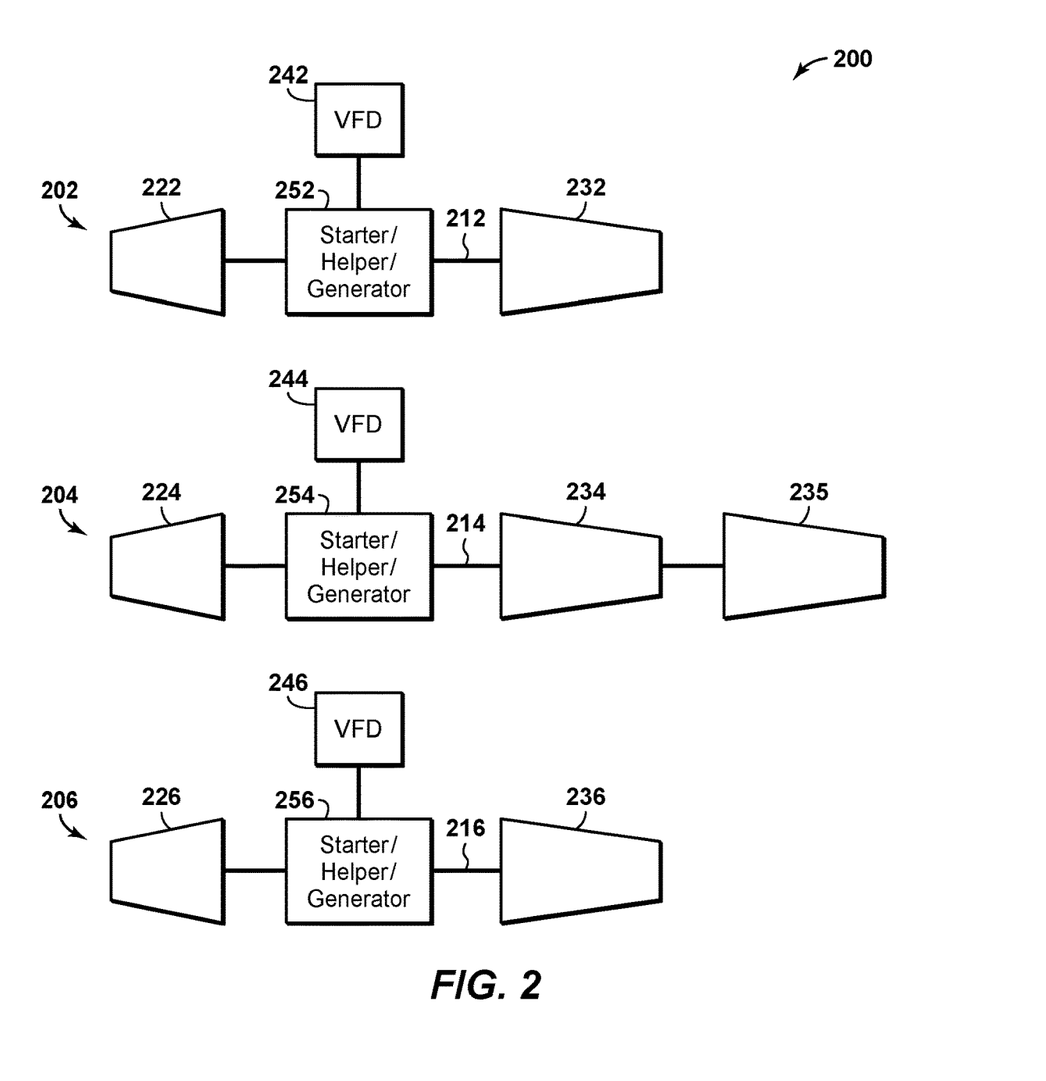
FIG. 2 is a schematic diagram of an LNG train according to known principles.

FIG. 2 is a schematic diagram of an exemplary LNG train 200 having first, second, and third compression strings 202, 204, 206 according to known principles. Each compression string includes a single shaft 212, 214, 216 and is driven by a single-shaft gas turbine 222, 224, 226, which in some cases may be a GE Frame 9E single-shaft gas turbine. Each compression string also includes one or more refrigeration compressors 232, 234, 235, 236. Each compression string further includes a large-scale variable frequency drive (VFD) 242, 244, 246 and a motor/generator 252, 254, 256. Such an LNG train may have a nominal LNG production capacity of 8 MTA. It has been observed that the compression power required by different strings operating in the same train is generally different, likely resulting in a gas turbine power use imbalance when the compression strings are driven by identical gas turbines. This creates an opportunity to export excess gas turbine power from one compression string to the plant electric power grid and to reallocate some or all of this excess power to supplement power driving one or more of the other compressor strings.

Figure 3:
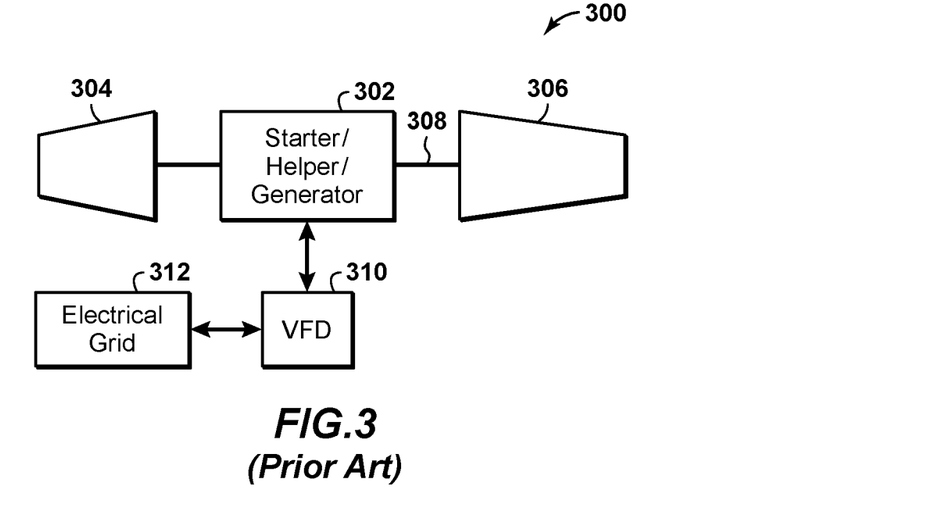
FIG. 3 is a schematic diagram of an LNG compression string according to known principles.

FIG. 3 depicts another known type of compression string 300, in which an electric starter/helper motor/generator 302 with drive-through capability is positioned between a turbine 304 and a compressor 306 on a common drive shaft 308, and a variable frequency drive (VFD) 310 electrically connected between the electric starter/helper motor/generator 302 and an electrical power grid 312. The VFD 310 conditions the AC frequency both from the electrical power grid 312 for smoother startup and nonsynchronous helper duty as well as to the electrical power grid, such that mechanical power can be converted to electrical power by the electric starter/helper motor/generator 302 and supplied to the electrical power grid at the grid frequency. This allows the speed of the turbine 304 to be dictated by throughput needs. This compression string 300, as disclosed by Rasmussen, enables LNG train configurations with single shaft gas turbines, such as LNG train 200, to maximize capacity by shifting excess gas turbine power to power limited compressor strings, and maximize fuel efficiency by operating all gas turbines at or near peak load. When used in an LNG train, compression string 300 permits nonsynchronous operation with each individual compression string and the electrical grid potentially at different operating speeds and frequencies, and for efficient gas turbine operation with speed control, thereby providing for LNG throughput control, compressor operating point optimization, and greater resilience to process upsets compared to known synchronous LNG train operation with single-shaft turbines at fixed speeds, as disclosed, for example, in U.S. Pat. No. 5,689,141 by Kikkawa.

Aeroderivatives are smaller scale multi-shaft turbines that do not require a large electrical motor for starting the compression strings, providing some cost benefits by eliminating the large electrical motors, variable frequency drives, and power generation capacity required by large scale single-shaft gas turbines. A larger number of aeroderivatives is required than large scale industrial turbines in order to achieve similar LNG train capacities due to the lower power output of the aeroderivative units, potentially increasing the overall cost of a large scale development. On the other hand, new multi-shaft gas turbine options are becoming available, including fuel efficient large scale multi-shaft industrial turbines such as the GE LMS100, the Mitsubishi Hitachi H110 and the Siemens SGT5-2000E turbines, and some of these large multi-shaft gas turbines operate at lower speeds compared to smaller turbines, thereby permitting more aerodynamically efficient large compressors that may be used in LNG service. What is therefore needed is an LNG compression string design and/or LNG train design that uses new turbine technology to support large-scale (i.e., >5 MTA) LNG production. What is also needed is such a large-scale LNG compression string design and/or LNG train design with a reduced amount of components contained therein.

SUMMARY

The disclosed aspects provide a drive system for liquefied natural gas (LNG) refrigeration compressors in a LNG liquefaction plant. First, second, and third refrigeration compression strings each include one or more refrigeration compressors, and a multi-shaft gas turbine capable of non-synchronous operation, the multi-shaft gas turbine being operationally connected to the one or more refrigeration compressors and configured to drive the one or more refrigeration compressors, wherein the multi-shaft gas turbine uses its inherent speed turndown range to start the one or more refrigeration compressors from rest, bring the one or more refrigeration compressors up to an operating rotational speed, and adjust compressor operating points to maximize efficiency of the one or more refrigeration compressors, without assistance from electrical motors with drive-through capability and variable frequency drives. The first refrigeration compression string is configured to provide compression to a propane refrigerant, the second refrigeration compression string is configured to provide compression to a mixed refrigerant, and the third refrigeration compression string is configured to provide compression to a nitrogen refrigerant.

The disclosed aspects also provide a method of producing liquefied natural gas (LNG). Each of first, second, and third refrigeration compression strings are arranged to include one or more refrigeration compressors and a multi-shaft gas turbine operationally connected to the one or more refrigeration compressors. The multi-shaft gas turbine in each of the first, second, and third refrigeration compression strings is used to drive the respective one or more refrigeration compressors using a non-synchronous operation. Compression to a propane refrigerant is provided using the first refrigeration compression string. Compression to a mixed refrigerant is provided using the second refrigeration compression string. Compression to a nitrogen refrigerant is provided using the third refrigeration compression string. Without assistance from electrical motors with drive-through capability or variable frequency drives, using an inherent speed turn-down range of at least one of the multi-shaft gas turbines of the first, second, and third refrigeration compression strings to start the one or more refrigeration compressors from rest, bring the one or more refrigeration compressors up to an operating rotational speed, and adjust compressor operating points to maximize efficiency of the one or more refrigeration compressors.

DESCRIPTION OF THE DRAWINGS

The advantages of the present techniques are better understood by referring to the following detailed description and the attached drawings, in which.

DETAILED DESCRIPTION

In the following detailed description section, non-limiting examples of the present techniques are described. However, to the extent that the following description is specific to a particular example or a particular use of the present techniques, this is intended to be for exemplary purposes only and simply provides a description of the exemplary examples. Accordingly, the techniques are not limited to the specific examples described below, but rather, include all alternatives, modifications, and equivalents falling within the true spirit and scope of the appended claims.

At the outset, for ease of reference, certain terms used in this application and their meanings as used in this context are set forth. Further, the present techniques are not limited by the usage of the terms shown below, as all equivalents, synonyms, new developments, and terms or techniques that serve the same or a similar purpose are considered to be within the scope of the present claims.

As one of ordinary skill would appreciate, different persons may refer to the same feature or component by different names. This document does not intend to distinguish between components or features that differ in name only. The figures are not necessarily to scale. Certain features and components herein may be shown exaggerated in scale or in schematic form and some details of conventional elements may not be shown in the interest of clarity and conciseness. When referring to the figures described herein, the same reference numerals may be referenced in multiple figures for the sake of simplicity. In the following description and in the claims, the terms "including" and "comprising" are used in an open-ended fashion, and thus, should be interpreted to mean "including, but not limited to."

The articles "them" "a" and "an" are not necessarily limited to mean only one, but rather are inclusive and open ended so as to include, optionally, multiple such elements.

As used herein, the terms "approximately." "about." "substantially," and similar terms are intended to have a broad meaning in harmony with the common and accepted usage by those of ordinary skill in the art to which the subject matter of this disclosure pertains. It should be understood by those of skill in the art who review this disclosure that these terms are intended to allow a description of certain features described and claimed without restricting the scope of these features to the precise numeral ranges provided. Accordingly, these terms should be interpreted as indicating that insubstantial or inconsequential modifications or alterations of the subject matter described and are considered to be within the scope of the disclosure.

"Exemplary" is used exclusively herein to mean "serving as an example, instance, or illustration." Any embodiment or aspect described herein as "exemplary" is not to be construed as preferred or advantageous over other embodiments.

The term "gas" is used interchangeably with "vapor," and is defined as a substance or mixture of substances in the gaseous state as distinguished from the liquid or solid state. Likewise, the term "liquid" means a substance or mixture of substances in the liquid state as distinguished from the gas or solid state.

A "hydrocarbon" is an organic compound that primarily includes the elements hydrogen and carbon, although nitrogen, sulfur, oxygen, metals, or any number of other elements can be present in small amounts. As used herein, hydrocarbons generally refer to components found in natural gas, oil, or chemical processing facilities.

"Natural gas" refers to a multi-component gas obtained from a crude oil well or from a subterranean gas-bearing formation. The composition and pressure of natural gas can vary significantly. A typical natural gas stream contains methane ($CH_4$) as a major component. i.e., greater than 50 mol % of the natural gas stream is methane. The natural gas stream can also contain ethane ($C_2H_6$), heavy hydrocarbons (e.g., $C_3$-$C_{20}$ hydrocarbons), one or more acid gases (e.g., $CO_2$ or $H_2S$), or any combinations thereof. The natural gas can also contain minor amounts of contaminants such as water, nitrogen, iron sulfide, wax, crude oil, or any combinations thereof. The natural gas stream can be substantially purified, so as to remove compounds that may act as poisons.

"Liquefied Natural Gas" or "LNG" refers to is natural gas that has been processed to remove one or more components (for instance, helium) or impurities (for instance, water and/or heavy hydrocarbons) and then condensed into a liquid at almost atmospheric pressure by cooling.

A "Large Scale" gas turbine is a gas turbine having a rated output capacity of at least 70 megawatts (MW), or at least 80 MW, or at least 100 MW.

A "mixed refrigerant" is refrigerant formed from a mixture of two or more components selected from the group comprising, nitrogen, methane, ethane, ethylene, propane, propylene, butanes, pentanes, etc. A mixed refrigerant or a mixed refrigerant stream as referred to herein comprises at least 5 mol % of two different components. A common composition for a mixed refrigerant can be: Nitrogen (0-10 mol %; Methane ($C_4$) 30-70 mol %; Ethane ($C_2$) 30-70 mol %; Propane ($C_3$) 0-30 mol %; Butanes ($C_4$) 0-15 mol % The total composition comprises 100 mol %.

"Substantial" when used in reference to a quantity or amount of a material, or a specific characteristic thereof, refers to an amount that is sufficient to provide an effect that the material or characteristic was intended to provide. The exact degree of deviation allowable may depend, in some cases, on the specific context.

"'Non-synchronous'" refers to rotational speeds that are not always aligned with local electrical grid frequency (which may be 50 Hz (3,000 rpm), 60 Hz (3,600 rpm), or another frequency) but fall within a commonly accepted operating range around the local frequency. Such operating range depends on the design of the turbine and may be ±3%, or ±5%, or ±10%, or ±20%, or more than ±20% of the local frequency.

The present techniques provide an LNG train having two or more compression strings. Each compression string has a refrigeration compressor that is non-synchronously driven by a large multi-shaft gas turbine. Each gas turbine is capable of starting its respective compressors from rest (either with refrigerant compression remaining in the refrigeration compression loop or without such compression) and to bring the compressors up to operating rotational speed. Each gas turbine is further configured to adjust compressor operating points to maximize efficiency using the inherent speed turndown range of the multi-shaft gas turbines. With this arrangement, electrical starter motors with drive-through capability and variable frequency drives are not required.

Figure 4:
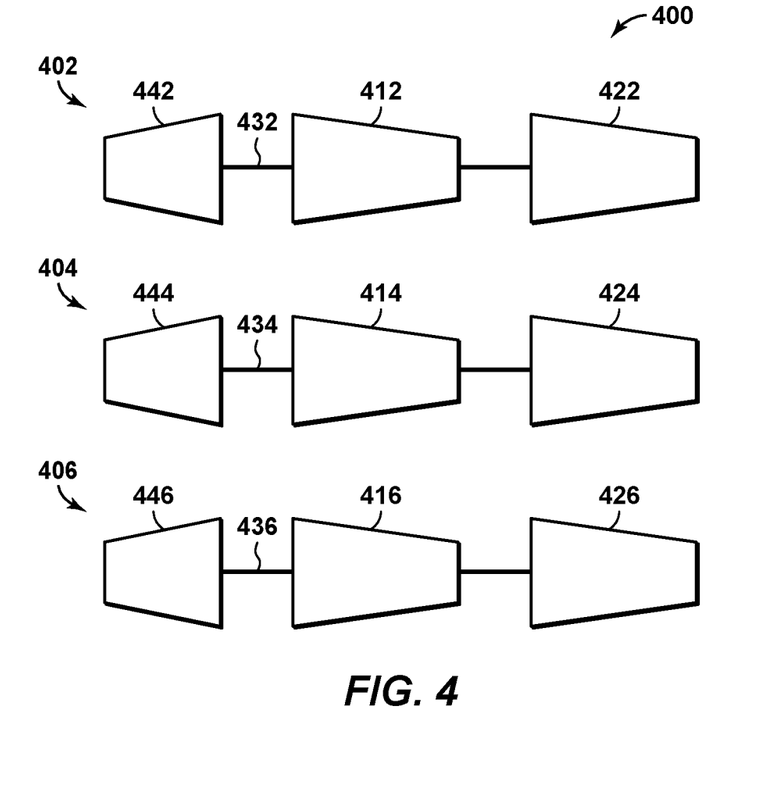
FIG. 4 is a schematic diagram of an LNG train according to disclosed aspects.

FIG. 4 is a schematic diagram of an LNG train 400 according to disclosed aspects. LNG train 400 includes two or more compression strings, and in a preferred aspect includes first, second, and third compression strings 402, 404, 406. First compression string 402 includes first and second refrigeration compressors 412, 422 connected via a first shaft 432 to one or more large-scale multi-shaft gas turbines 442. Second compression string 404 includes third and fourth refrigeration compressors 414, 424 connected via a second shaft 434 to one or more large-scale multi-shaft gas turbines 444. Third compression string 406 includes fifth and sixth refrigeration compressors 416, 426 connected via a third shaft 436 to one or more large-scale multi-shaft gas turbines 446. Each of the one or more large scale multi-shaft gas turbines 442, 444, 446 provide a driving force to the refrigeration compressors associated with its respective compression string. In an aspect, the large scale multi-shaft gas turbines 442, 444, 446 may comprise the GE LMS 100 turbine, the Mitsubishi Hitachi H110 turbine, the Siemens SGT5-2000E turbine, or any other large-scale multi-shaft gas turbine. Because the large scale multi-shaft gas turbines can take advantage of their inherent wider turndown range than single-shaft gas turbines, LNG train production and efficiency may be improved and even maximized. For example, the inherent turn-down range of the large scale multi-shaft gas turbines may be used to start the compressors from rest, bring the compressors up to an operating rotational speed, and adjust the compressor operating points to maximize efficiency of the compressors, all without assistance from electrical motors with drive-through capability or variable frequency drives. The use of large scale fuel-efficient multi-shaft gas turbines in a configuration as shown in FIG. 4 allows for LNG train capacities in excess of 7-8 MTA with only three refrigerant compression strings. While this is a comparable output to current very large LNG trains using the same number of compression strings, because starter and electrical power are no longer necessary to achieve these capacities with the LNG train 400, the electrical equipment such as the starter/helper motor/generator 302 and the variable frequency drive 310 (FIG. 3) can be eliminated from the refrigerant compression strings. The elimination of these components (including the removal or downsizing of some electrical power generation equipment otherwise required to drive the starter/helper motors) provides significant capital cost savings as well as operating savings.

In an aspect, first compression string 402 may be used to provide compression for a propane refrigerant, second compression string 404 may be used to provide compression for a mixed refrigerant, and third compression string 406 may be used to provide compression for a nitrogen refrigerant. In a further aspect, the refrigeration compressor(s) of one or more of the first, second, and third compression strings may be configured to assist the compression work of the other compression strings by moving compression stages from said compressor to that string. For example, large-scale multi-shaft gas turbine 442 of the first compression string 402 may be used to assist in the compression of the mixed refrigerant by refrigeration compressors 424, 414 of the second compression string 404 by moving all or part of the compression stage to first compression string 402, thereby assisting the second compression string 404.

In another aspect, two of the compression strings may be designed to provide compression to the same two refrigerants. For example, first and fourth refrigeration compressors 412, 424 may be designed to provide compression to a first refrigerant, such as propane, and second and third refrigeration compressors 422, 414, may be designed to provide compression to a second refrigerant, such as a mixed refrigerant. With this configuration, it may be possible to only require one of the first and second refrigeration strings 402, 404 for natural gas liquefaction. This may be desirable when only a small amount of natural gas is available, or when one of the refrigeration strings is shut down for maintenance or replacement. Additionally, and when used in conjunction with third compression string 406, it may be possible to only require (a) one of the first and second refrigeration strings 402, 404, and (b) the third refrigeration string 406, for natural gas liquefaction. This scenario may be desirable when a higher LNG production rate is desired, because the nitrogen compressed by the third compression string 406 would provide the additional chilling necessary to liquefy natural gas when only one of the first and second refrigeration strings 402, 404 are being used. In any event, the first and second refrigeration strings 402, 404 may be configured such that the third compression string 406 is not required for natural gas liquefaction.

The disclosed aspects may be advantageously used when operation of one, two, or all of the large scale, multi-shaft turbines is required to chill the air to be combusted in the large-scale, multi-shaft gas turbines of the first, second, and third refrigeration compression strings. Furthermore, the disclosed aspects may be advantageously used in liquefaction operations, such as the liquefaction of natural gas to produce LNG.

While the wide speed range of multi-shaft gas turbines provides for throughput control and efficient gas turbine operation, the removal of the starter/helper motor/generators may result in a scenario where an LNG train as shown in FIG. 4 operates with a power imbalance as previously described, with one compression string being power limited while there is excess gas turbine power available to one or two of the other strings. This situation can be avoided or mitigated by selecting an optimal process and machinery configuration that maximizes use of the gas turbine power with consideration for characteristic variations in ambient temperature and feed gas compositions. These configurations include but are not limited to the AP-C3MR™ process and the AP-X® process using independent or split mixed refrigerant configurations. Refrigeration compressors can be further configured in series or in parallel to optimize gas turbine power use and overall LNG train reliability.

Figure 5:
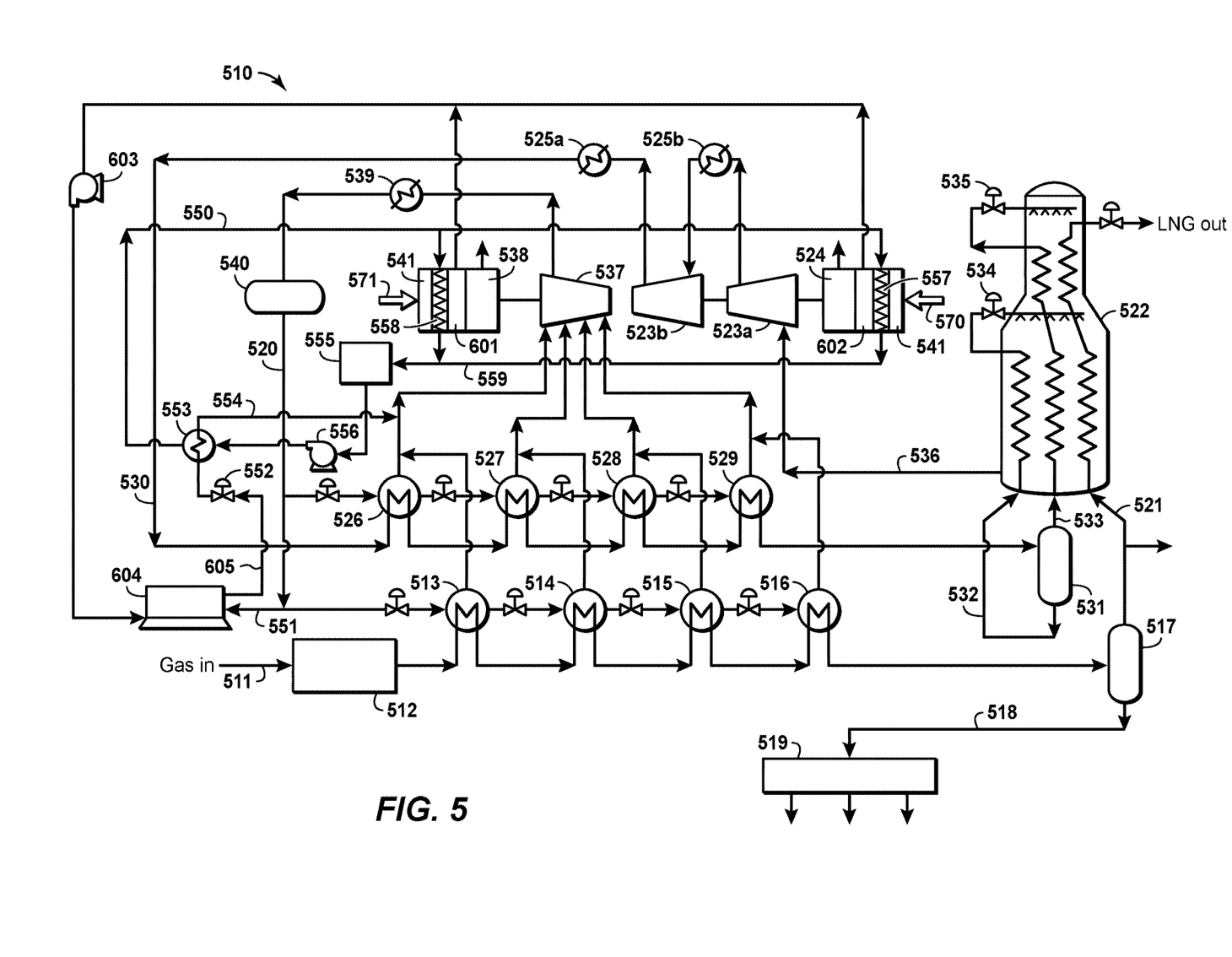
FIG. 5 is a schematic diagram of an LNG liquefaction system that may be used with the disclosed aspects.
Figure 6:
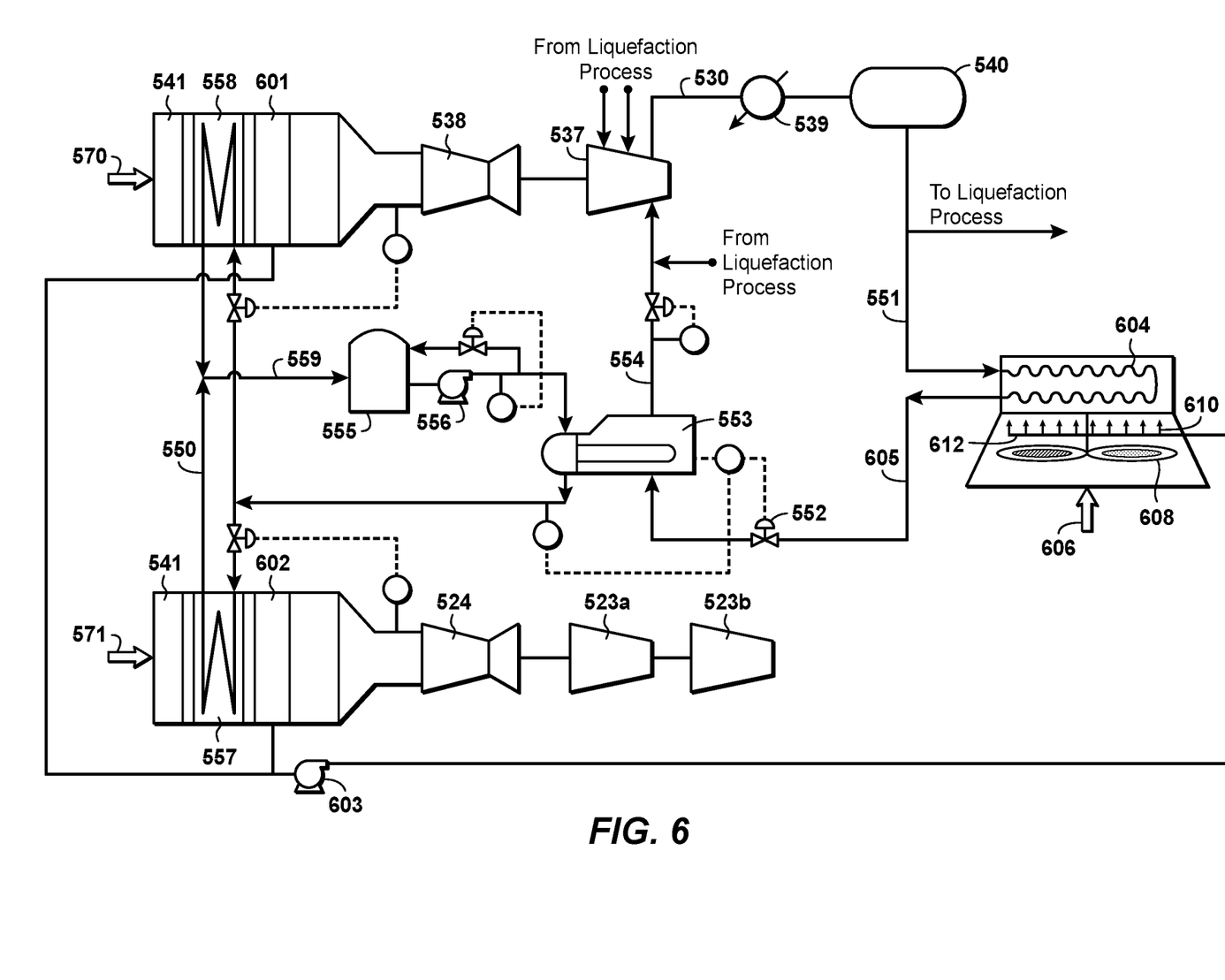
FIG. 6 is a schematic diagram of a detail of FIG. 5.

In another aspect, inlet air chilling can be applied to fully use excess gas turbine power and to maximize LNG production in an LNG train. FIGS. 5-6 illustrate a system 510 and process for liquefying natural gas (LNG) that uses inlet air chilling. This system and similar inlet air chilling systems are further described in commonly owned U.S. Patent Publication No. 2018/0051928, filed Aug. 16, 2016, and in U.S. Pat. No. 6,324,867, the disclosures of which are incorporated by reference herein in their entirety. In system 510, feed gas (natural gas) enters through an inlet line 511 into a preparation unit 512 where it is treated to remove contaminants. The treated gas then passes from preparation unit 512 through a series of heat exchangers 513, 514, 515, 516, where it is cooled by evaporating the first refrigerant (e.g. propane) which, in turn, is flowing through the respective heat exchangers through a first refrigeration circuit 520. The cooled natural gas then flows to fractionation column 517 wherein pentanes and heavier hydrocarbons are removed through line 518 for further processing in a fractionating unit 519.

Figure 1:
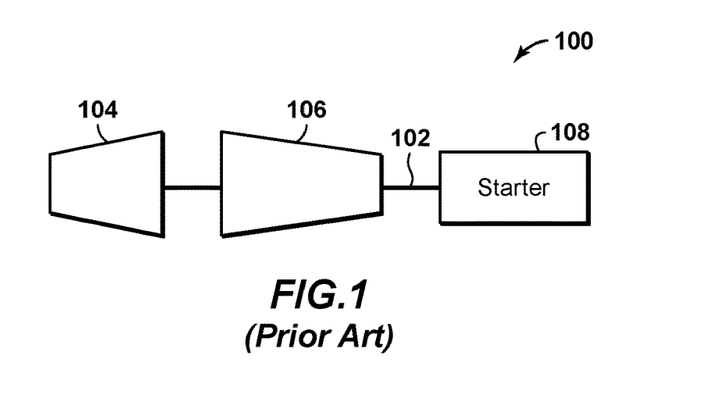
FIG. 1 is a schematic diagram of an LNG compression string according to known principles.

The remaining mixture of methane, ethane, propane, and butane is removed from fractionation column 517 through line 521 and is liquefied in the main cryogenic heat exchanger 522 by further cooling the gas mixture with a second refrigerant that may comprise a mixed refrigerant (MR) which flows through a second refrigerant circuit 530. The second refrigerant, which may include at least one of nitrogen, methane, ethane, and propane, is compressed in compressors 523a. 523b which, in turn, are driven by a gas turbine 524. After compression, the second refrigerant is cooled by passing through air or water coolers 525a, 525b and is then partly condensed within heat exchangers 526, 527, 528, and 529 by evaporating the first refrigerant from first refrigerant circuit 520. The second refrigerant may then flow to a high pressure separator 531, which separates the condensed liquid portion of the second refrigerant from the vapor portion of the second refrigerant. The condensed liquid and vapor portions of the second refrigerant are output from the high pressure separator 531 in lines 532 and 533, respectively. As seen in FIG. 1, both the condensed liquid and vapor from high pressure separator 531 flow through main cryogenic heat exchanger 522 where they are cooled by evaporating the second refrigerant.

The condensed liquid stream in line 532 is removed from the middle of main cryogenic heat exchanger 522 and the pressure thereof is reduced across an expansion valve 534. The now low pressure second refrigerant is then put back into the main cryogenic heat exchanger 522 where it is evaporated by the warmer second refrigerant streams and the feed gas stream in line 521. When the second refrigerant vapor stream reaches the top of the main cryogenic heat exchanger 522, it has condensed and is removed and expanded across an expansion valve 535 before it is returned to the main cryogenic heat exchanger 522. As the condensed second refrigerant vapor falls within the main cryogenic heat exchanger 522, it is evaporated by exchanging heat with the feed gas in line 521 and the high pressure second refrigerant stream in line 532. The falling condensed second refrigerant vapor mixes with the low pressure second refrigerant liquid stream within the middle of the main cryogenic heat exchanger 522 and the combined stream exits the bottom of the main cryogenic heat exchanger 522 as a vapor through outlet 536 to flow back to compressors 523a, 523b to complete second refrigerant circuit 530.

The closed first refrigeration circuit 520 is used to cool both the feed gas and the second refrigerant before they pass through main cryogenic heat exchanger 522. The first refrigerant is compressed by a first refrigerant compressor 537 which, in turn, is powered by a gas turbine 538. In an aspect, an additional refrigerant compressor and gas turbine (not shown), arranged in parallel with the first refrigerant compressor 537 and the gas turbine 538, may be used to compress the first refrigerant, it being understood that reference to the first refrigerant compressor 537 and the gas turbine 538 herein also refer to said additional refrigerant compressor and gas turbine. The first refrigerant compressor 537 may comprise at least one compressor casing and the at least one casing may collectively comprise at least two inlets to receive at least two first refrigerant streams at different pressure levels. The compressed first refrigerant is condensed in one or more condensers or coolers 539 (e.g. seawater or air cooled) and is collected in a first refrigerant surge tank 540 from which it is cascaded through the heat exchangers (propane chillers) 513, 514.515, 516, 526, 527, 528, 529 where the first refrigerant evaporates to cool both the feed gas and the second refrigerant, respectively. Both gas turbine systems 524 and 538 may comprise air inlet systems that in turn may comprise air filtration devices, moisture separation devices, chilling and/or heating devices or particulate separation devices.

Means may be provided in system 510 of FIG. 1 for cooling the inlet air 570, 571 to both gas turbines 524 and 538 for improving the operating efficiency of the turbines. Basically, the system may use excess refrigeration available in system 510 to cool an intermediate fluid, which may comprise water, glycol or another heat transfer fluid, that, in turn, is circulated through a closed, inlet coolant loop 550 to cool the inlet air to the turbines.

Referring to FIG. 2, to provide the necessary cooling for the inlet air 570, 571, a slip-stream of the first refrigerant is withdrawn from the first refrigeration circuit 520 (i.e. from surge tank 540) through a line 551 and is flashed across an expansion valve 552. Since first refrigeration circuit 520 is already available in gas liquefaction processes of this type, there is no need to provide a new or separate source of cooling in the process, thereby substantially reducing the costs of the system. The expanded first refrigerant is passed from expansion valve 552 and through a heat exchanger 553 before it is returned to first refrigeration circuit 520 through a line 554. The propane evaporates within heat exchanger 553 to thereby lower the temperature of the intermediate fluid which, in turn, is pumped through the heat exchanger 553 from a storage tank 555 by pump 556.

The cooled intermediate fluid is then pumped through air chillers or coolers 557, 558 positioned at the inlets for turbines 524, 538, respectively. As inlet air 570, 571 flows into the respective turbines, it passes over coils or the like in the air chillers or coolers 557, 558 which, in turn, cool the inlet air 570, 571 before the air is delivered to its respective turbine. The warmed intermediate fluid is then returned to storage tank 555 through line 559. Preferably, the inlet air 570, 571 will be cooled to no lower than about 5° Celsius (41° Fahrenheit) since ice may form at lower temperatures. In some instances, it may be desirable to add an anti-freeze agent (e.g. ethylene glycol) with inhibitors to the intermediate fluid to prevent plugging, equipment damage and to control corrosion.

One aspect of the present disclosure is illustrated in detail in FIG. 6. FIG. 6 adds a wet air fin cooler 604 is connected to the first refrigeration circuit 520. As used with the present disclosure, wet air fin cooler 604 combines the cooling effectiveness of (a) a conventional air fin heat exchanger, which may use a fan 608 to pass ambient air over finned tubes through which pass the fluid (e.g. liquid or gas) to be cooled to near ambient temperature (e.g. dry bulb temperature), with (b) psychometric cooling by vaporizing a liquid, typically water, within the ambient air stream using, for example, nozzles 610 in a spray header 612, to approach the lower wet bulb temperature of the ambient air.

Wet air fin cooler 604 is used to sub-cool the slip-stream of liquid first refrigerant in line 551 from surge tank 540. The sub-cooled first refrigerant is directed through line 605 to heat exchanger 553. Sub-cooling this propane increases both the refrigeration duty of heat exchanger 553 and the coefficient of performance of the refrigeration system. This coefficient of performance is the ratio of the refrigeration duty of the heat exchanger 553 divided by the incremental compressor power to provide that refrigeration. The wet air fin cooler 604 is positioned to cool the slip-stream of first refrigerant in line 551 in FIGS. 5 and 6. Alternatively, the wet air fin cooler 604 could be incorporated as part of the one or more condensers or coolers 539 to sub-cool liquid propane that serves the other parts of the liquefaction process before the slip-stream of first refrigerant in line 551 is removed to provide a source of cooling (direct or indirect) to air chillers or coolers 557, 558. However, it is preferred to sub-cool only the slip-stream of propane in line 551 to maximize the benefit with respect to gas turbine inlet air chilling.

According to disclosed aspects, separators 601 and 602 are positioned in the gas turbine air inlet following the air chillers or coolers 558, 557, respectively. These separators 601, 602 remove the water that is condensed from the inlet air 570, 571 as the inlet air is cooled from its ambient dry bulb temperature to a temperature below its wet bulb temperature. Separators 601, 602 may be of the inertial type, such as vertical vane, coalescing elements, a low velocity plenum, or a moisture separator known to those skilled in the art. The gas turbine air inlet may include filtration elements, such as air filters 541, that may be located either upstream or downstream or both up and downstream of the air chillers or coolers 557, 558 and the separators 601, 602, respectively. Preferably, at least one filtration element is located upstream of the chiller(s) and separator(s). This air filtration element may include a moisture barrier, such as an ePTFE (expanded PTFE) membrane which may be sold under the GORETEX trademark, to remove atmospheric mist, dust, salts or other contaminants that may be concentrated in the condensed water removed by separators 601, 602. By locating at least one filtration element or similar device upstream of the chiller and separator associated with gas turbines 524 and/or 538, atmospheric contaminants in the collected moisture (water) can be minimized, fouling and corrosion of the chiller(s) and separator(s) can be minimized, and fouling and corrosion of the wet air fin cooler 604 can also be controlled and minimized.

During the chilling of the gas turbine inlet air 570, 571, a significant portion of the refrigeration duty is used to condense the moisture in the gas turbine inlet air 570, 571 rather than simply reducing the dry bulb temperature of the inlet air. As an example, if inlet air with a dry bulb temperature of 40° Celsius and a wet bulb temperature of 24° Celsius is chilled, the effective specific heat of the air is about 1 kJ/kg/° C. between 40° C. and 24° C. but increases dramatically to about 3 kJ/kg/° C. below the wet bulb temperature of 24° C. as the dry bulb temperature is reduced and moisture is condensed from the air. From this, one could conclude that about two-thirds of the refrigeration duty used to chill the air below the wet bulb temperature (dew point) is wasted since the small compositional change of the air to the gas turbine 524 and/or 538 has only a small effect on the available power of the gas turbine. This condensed moisture is essentially at the same temperature as the chilled inlet air to the gas turbine and could be used to provide some precooling of the inlet air 570, 571 using another chilling coil similar to air chillers or coolers 557 or 558 that is positioned ahead of the air chillers or coolers 557 or 558 in the air flow. However, this arrangement can only recoup the part of the refrigeration duty used to reduce the temperature of the water but not the part used to condense it. That is, the heat of vaporization of the water cannot be recouped by heat transfer or psychometric cooling with the gas turbine inlet air.

A much greater portion of the refrigeration duty used to cool and condense the moisture from the gas turbine inlet air 570, 571 can be recouped by collecting this chilled water from separators 601 or 602, pumping it with a pump 603 and spraying the water onto the tubes of the wet air fin cooler 604 or otherwise mixing the water with the air flow 606 to the wet air fin cooler 604. Based on the ambient conditions and the actual flow rate of air conveyed by the fan associated with the wet air fin cooler 604, the water pumped by pump 603 may be sufficient to saturate the air flow of wet air fin cooler 604 and bring it to its wet bulb temperature. Excess water flow from separators 601, 602 may be available that could be used for another purpose, or may be insufficient to saturate the air flow. In this later case, additional water from another source may be provided.

Figure 7:
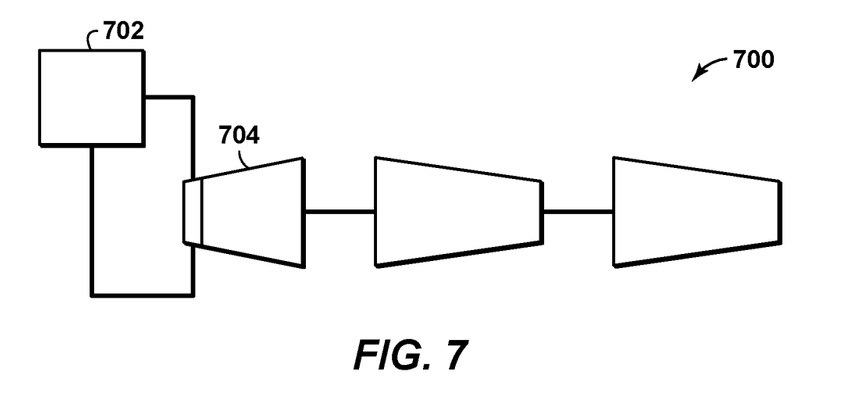
FIG. 7 is a schematic diagram of an LNG refrigeration compression string according to disclosed aspects.
Figure 8:
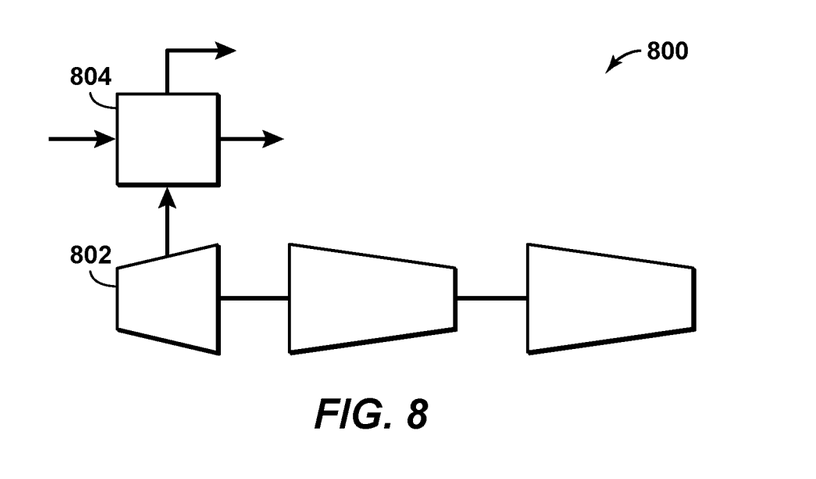
FIG. 8 is a schematic diagram of an LNG refrigeration compression string according to disclosed aspects.
Figure 9:
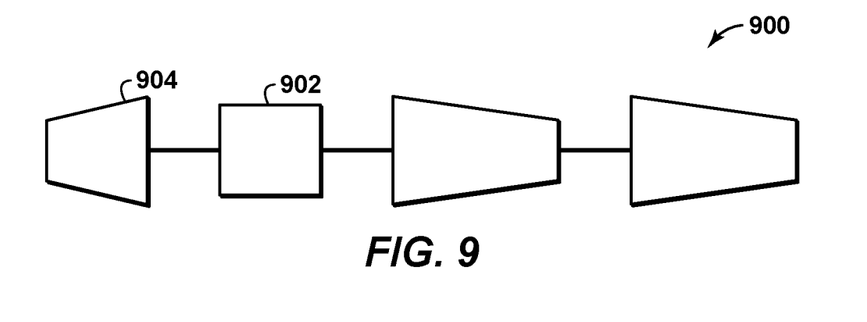
FIG. 9 is a schematic diagram of an LNG refrigeration compression string according to disclosed aspects.

The disclosed aspects may be varied in many ways. For example, FIG. 7 depicts a refrigeration compression string 700 that may be part of an LNG train according to disclosed aspects, in which an independent cooling mechanical refrigeration system 702 chills the inlet air of the large scale multi-shaft gas turbine 704. As with the inlet air cooling system disclosed in FIGS. 5 and 6, such inlet air cooling or chilling boosts power available to the refrigeration compression string 700, thereby likely exceeding single train capacities of 9 MTA. FIG. 8 depicts another refrigeration compression string 800 that may be part of an LNG train according to disclosed aspects, in which a large scale multi-shaft gas turbine 802 is equipped with a waste heat recovery unit 804, according to known principles, which extracts heat from the hot exhaust gases of the turbine, thereby increasing overall energy efficiency of the LNG train. The inputs and outputs of the waste heat recovery unit are not shown in FIG. 8 so that any such waste heat recovery unit is represented thereby FIG. 9 depicts another refrigeration compression string 900 that may be part of an LNG train according to disclosed aspects, in which an electrical generator 902 is included as part of the refrigeration compression string. The electrical generator 902 converts excess mechanical power of the large scale multi-shaft gas turbine 904 into electricity and exports the electricity to an electrical grid (not shown). Any of the aspects disclosed in FIGS. 7-9 may be implemented in one, two, or three of the refrigeration compression strings of the LNG train 400 depicted in FIG. 4. Moreover, it is contemplated that features from various examples described herein can be combined together, including some but not necessarily all the features provided for given examples. Furthermore, the features of any particular example are not necessarily required to implement the present technological advancement.

Figure 10:
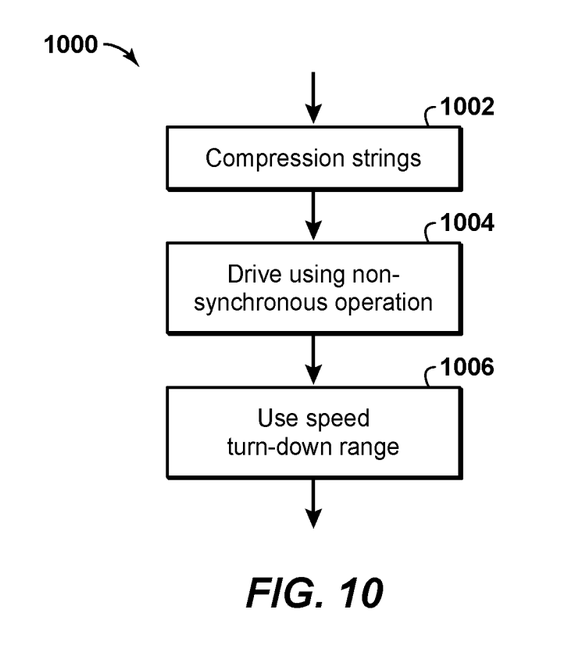
FIG. 10 is a flowchart of a method according to disclosed aspects.

FIG. 10 is a method 1000 of producing liquefied natural gas (LNG) according to aspects of the disclosure. At block 1002 each of first, second, and third refrigeration compression strings are arranged to include one or more refrigeration compressors and a multi-shaft gas turbine operationally connected to the one or more refrigeration compressors. At block 1004, using the multi-shaft gas turbine in each of the first, second, and third refrigeration compression strings, the respective one or more refrigeration compressors are driven using a non-synchronous operation. At block 1006, without assistance from electrical motors with drive-through capability or variable frequency drives, an inherent speed turndown range of at least one of the multi-shaft gas turbines of the first, second, and third refrigeration compression strings is used to start the one or more refrigeration compressors from rest (either with refrigerant compression remaining in the refrigeration compression loop or without such compression), bring the one or more refrigeration compressors up to an operating rotational speed, and adjust compressor operating points to maximize efficiency of the one or more refrigeration compressors.

The disclosed aspects provide a method of producing LNG using two or more compression strings without the need for expensive start-up motors or variable speed drives. An advantage of the disclosed aspects is reduced capital expense for a large-scale LNG train (i.e., greater than 7 MTA). Another advantage is a reduced areal footprint of a large-scale LNG train. Still another advantage is that the LNG train may be coupled with other technologies (such as inlet air cooling or exhaust heat recovery) to improve efficiencies of the LNG train.

Aspects of the disclosure may include any combinations of the methods and systems shown in the following numbered paragraphs. This is not to be considered a complete listing of all possible aspects, as any number of variations can be envisioned from the description above.

1. A drive system for liquefied natural gas (LNG) refrigeration compressors in a LNG liquefaction plant, comprising:
   first, second, and third refrigeration compression strings, each refrigeration compression string including
      one or more refrigeration compressors, and
      a multi-shaft gas turbine capable of non-synchronous operation, the multi-shaft gas turbine being operationally connected to the one or more refrigeration compressors and configured to drive the one or more refrigeration compressors, wherein the multi-shaft gas turbine uses its inherent speed turndown range to
         start the one or more refrigeration compressors from rest,
         bring the one or more refrigeration compressors up to an operating rotational speed, and
         adjust compressor operating points to maximize efficiency of the one or more refrigeration compressors,
         without assistance from electrical motors with drive-through capability and variable frequency drives;
   wherein the first refrigeration compression string is configured to provide compression to a propane refrigerant, the second refrigeration compression string is configured to provide compression to a mixed refrigerant, and the third refrigeration compression string is configured to provide compression to a nitrogen refrigerant.

2. The drive system of paragraph 1, further comprising a waste heat recovery unit that extracts heat from exhaust gases of the multi-shaft gas turbine of at least one of the first, second, and third refrigeration compression strings, thereby increasing overall energy efficiency of the LNG liquefaction plant.

3. The drive system of paragraph 1 or paragraph 2, further comprising an inlet air chilling apparatus configured to chill air entering an inlet of the multi-shaft gas turbine of at least one of the first, second, and third refrigeration compression strings, thereby maximizing natural gas throughput and/or efficiency of the LNG liquefaction plant.

4. The drive system of paragraph 3, wherein the inlet air chilling apparatus comprises a mechanical refrigeration system that is independent of the first, second, or third refrigeration compression strings.

5. The drive system of paragraph 3, wherein the inlet air chilling apparatus comprises a mechanical refrigeration system that is integrated with at least one of the first, second, or third refrigeration compression strings, wherein the air entering the inlet of the multi-shaft gas turbine of at least one of the first, second, and third refrigeration compression strings is chilled using refrigerant compressed by one or more of the refrigeration compressors of the first, second, or third compression strings.

6. The drive system of any of paragraphs 1-5, wherein operation of all of the multi-shaft gas turbines of the first, second, and third refrigeration compression strings is required for natural gas liquefaction.

7. The drive system of any of paragraphs 1-5, wherein operation of only two of the multi-shaft gas turbines of the first, second, and third refrigeration compression strings is required for natural gas liquefaction.

8. The drive system of paragraph 7, wherein the first refrigeration compression string is further configured to provide compression to a mixed refrigerant, the second refrigeration compression string is further configured to provide compression to the propane refrigerant, and wherein operation of
only one of the multi-shaft gas turbines of the first refrigeration compression string and the second refrigeration compression string, and
the multi-shaft gas turbine of the third refrigeration compression string, is required for natural gas liquefaction.

9. The drive system of any of paragraphs 1-5, wherein the first refrigeration compression string is further configured to provide compression to the mixed refrigerant, the second refrigeration compression string is further configured to provide compression to the propane refrigerant, and wherein operation of only one of the multi-shaft gas turbines of the first, second, and third refrigeration compression strings is required for natural gas liquefaction.

10. The drive system of any of paragraphs 1-9, wherein a refrigerant compressed by at least one of the refrigeration compressors of at least one of the first, second, or third refrigeration compression strings is cooled by air.

11. The drive system of any of paragraphs 1-10, wherein a refrigerant compressed by at least one of the refrigeration compressors of at least one of the first, second, or third refrigeration compression strings is cooled by water.

12. The drive system of any of paragraphs 1-11, wherein at least one of the first, second, and third refrigeration compression strings includes an electrical generator that converts excess turbine mechanical power to electricity and exports the electricity to an electrical grid.

13. The drive system of any of paragraphs 1-12, wherein each multi-shaft gas turbine of the first, second, and third refrigeration compression strings has a rated output capacity of at least 70 megawatts.

14. The drive system of paragraph 1, wherein one or more refrigeration compressors of one of the first, second, and third compression strings assists compression work of another of the first, second, and third compression strings.

15. A method of producing liquefied natural gas (LNG), comprising:
arranging each of first, second, and third refrigeration compression strings to include one or more refrigeration compressors and a multi-shaft gas turbine operationally connected to the one or more refrigeration compressors;
using the multi-shaft gas turbine in each of the first, second, and third refrigeration compression strings, driving the respective one or more refrigeration compressors using a non-synchronous operation;
providing compression to a propane refrigerant using the first refrigeration compression string;
providing compression to a mixed refrigerant using the second refrigeration compression string;
providing compression to a nitrogen refrigerant using the third refrigeration compression string;
without assistance from electrical motors with drive-through capability or variable frequency drives, using an inherent speed turn-down range of at least one of the multi-shaft gas turbines of the first, second, and third refrigeration compression strings to
start the one or more refrigeration compressors from rest,
bring the one or more refrigeration compressors up to an operating rotational speed, and
adjust compressor operating points to maximize efficiency of the one or more refrigeration compressors.

16. The method of paragraph 15, further comprising:
extracting heat from exhaust gases of the multi-shaft gas turbine of at least one of the first, second, and third refrigeration compression strings using a waste heat recovery unit.

17. The method of paragraph 15 or paragraph 16, further comprising:
chilling air entering an inlet of the multi-shaft gas turbine of at least one of the first, second, and third refrigeration compression strings.

18. The method of paragraph 17, wherein the inlet air chilling apparatus comprises a mechanical refrigeration system that is independent of the first, second, or third refrigeration compression strings.

19. The method of paragraph 17, wherein chilling the air comprises:
chilling the air entering the inlet of the multi-shaft gas turbine of at least one of the first, second, and third refrigeration compression strings using refrigerant compressed by one or more of the refrigeration compressors of the first, second, or third compression strings.

20. The method of any of paragraphs 15-20, wherein operation of all of the multi-shaft gas turbines of the first, second, and third refrigeration compression strings is required for natural gas liquefaction.

21. The method of any of paragraphs 15-19, wherein operation of only two of the multi-shaft gas turbines of the first, second, and third refrigeration compression strings is required for natural gas liquefaction.

22. The method of paragraph 21, further comprising:
providing compression to the propane refrigerant and the mixed refrigerant using the first refrigeration compression string; and
providing compression to the propane refrigerant and the mixed refrigerant using the second refrigeration compression string;
wherein operation of only one of
the multi-shaft gas turbines of the first refrigeration compression string and the second refrigeration compression string, and the multi-shaft gas turbine of the third refrigeration compression string,
is required for natural gas liquefaction.

23. The method of any of paragraphs 15-19, further comprising:
providing compression to the propane refrigerant and the mixed refrigerant using the first refrigeration compression string; and
providing compression to the propane refrigerant and the mixed refrigerant using the second refrigeration compression string;
wherein operation of only one of the multi-shaft gas turbines of the first, second, and third refrigeration compression strings is required for natural gas liquefaction.

24. The method of any of paragraphs 15-23, further comprising:
air-cooling a refrigerant compressed by at least one of the refrigeration compressors of at least one of the first, second, or third refrigeration compression strings.

25. The method of any of paragraphs 15-24, further comprising:
water-cooling a refrigerant compressed by at least one of the refrigeration compressors of at least one of the first, second, or third refrigeration compression strings.

26. The method of any of paragraphs 15-25, further comprising:
converting excess turbine electrical power of the multi-shaft gas turbine of at least one of the first, second, and third refrigeration compression strings into electricity using an electrical generator; and
exporting the electricity to an electrical grid.

27. The method of any of paragraphs 15-26, further comprising:
moving one or more compression stages of a refrigeration compressor in one of the first, second, or third compression strings, to another of the first, second, or third compression strings, to thereby assist compression work of the one of the first, second, or third compression strings.

While the present techniques can be susceptible to various modifications and alternative forms, the examples described above are non-limiting. It should again be understood that the techniques is not intended to be limited to the particular embodiments disclosed herein. Indeed, the present techniques include all alternatives, modifications, and equivalents falling within the true spirit and scope of the appended claims.

What is claimed is:

1. A method of producing liquefied natural gas (LNG) in a LNG liquefaction plant, comprising:
arranging each of first, second, and third refrigeration compression strings to include one or more refrigeration compressors and a multi-shaft gas turbine operationally connected to the one or more refrigeration compressors;
using the multi-shaft gas turbine in each of the first, second, and third refrigeration compression strings, driving the respective one or more refrigeration compressors at an operating rotational speed that is not always aligned with the frequency of an electrical grid of the LNG liquefaction plant;
providing compression to a propane refrigerant using only the first refrigeration compression string;
providing compression to a mixed refrigerant using only the second refrigeration compression string;
providing compression to a nitrogen refrigerant using only the third refrigeration compression string;
without assistance from electrical motors with drive-through capability or variable frequency drives, using an inherent speed turn-down range of the multi-shaft gas turbine of at least one of the first, second, and third refrigeration compression strings to
start the one or more refrigeration compressors from rest,
bring the one or more refrigeration compressors up to an initial operating rotational speed, and
adjust compressor operating points to maximize efficiency of the one or more refrigeration compressors; and
wherein operation of the multi-shaft gas turbine of only two of the first, second, and third refrigeration compression strings is required for natural gas liquefaction, wherein each multi-shaft gas turbine of the first, second, and third refrigeration compression strings has a rated output capacity of at least 70 megawatts.

2. The method of claim 1, further comprising:
extracting heat from exhaust gases of the multi-shaft gas turbine of at least one of the first, second, and third refrigeration compression strings using a waste heat recovery unit.

3. The method of claim 1, further comprising:
chilling air entering an inlet of the multi-shaft gas turbine of at least one of the first, second, and third refrigeration compression strings.

4. The method of claim 3, wherein the inlet air chilling apparatus comprises a mechanical refrigeration system that is independent of the first, second, or third refrigeration compression strings.

5. The method of claim 3, wherein chilling the air comprises:
chilling the air entering the inlet of the multi-shaft gas turbine of at least one of the first, second, and third refrigeration compression strings using refrigerant compressed by one or more of the refrigeration compressors of the first, second, or third compression strings.

6. The method of claim 1, further comprising:
air-cooling a refrigerant compressed by at least one of the refrigeration compressors of at least one of the first, second, or third refrigeration compression strings.

7. The method of claim 1, further comprising:
water-cooling a refrigerant compressed by at least one of the refrigeration compressors of at least one of the first, second, or third refrigeration compression strings.

8. The method of claim 1, further comprising:
converting excess turbine electrical power of the multi-shaft gas turbine of at least one of the first, second, and third refrigeration compression strings into electricity using an electrical generator; and
exporting the electricity to an electrical grid.

* * * * *